United States Patent [19]
Petsko

[11] Patent Number: 5,999,294
[45] Date of Patent: Dec. 7, 1999

[54] DETACHABLE ANTENNA WITH OPTICAL PORT

[75] Inventor: David P. Petsko, Akron, Ohio

[73] Assignee: Aironet Wireless Communications, Inc., Fairlawn, Ohio

[21] Appl. No.: 08/816,568

[22] Filed: Mar. 13, 1997

[51] Int. Cl.⁶ .................................................. H04B 10/10
[52] U.S. Cl. .......................... 359/145; 359/155; 359/163
[58] Field of Search ..................................... 359/163, 145, 359/155

[56] References Cited

U.S. PATENT DOCUMENTS

| | | | |
|---|---|---|---|
| 5,075,792 | 12/1991 | Brown et al. | 359/152 |
| 5,081,543 | 1/1992 | Romandi | 359/145 |
| 5,218,187 | 6/1993 | Koenck et al. | 235/375 |
| 5,343,319 | 8/1994 | Moore | 359/152 |
| 5,495,358 | 2/1996 | Bartig et al. | 359/189 |
| 5,585,953 | 12/1996 | Zavrel | 359/152 |
| 5,668,977 | 9/1997 | Swanstrom et al. | 395/500 |
| 5,781,321 | 7/1998 | Kobayashi | 359/163 |
| 5,812,293 | 9/1998 | Yen | 359/145 |
| 5,877,882 | 3/1999 | Green et al. | 359/163 |

*Primary Examiner*—Leslie Pascal
*Attorney, Agent, or Firm*—Arter & Hadden LLP

[57] ABSTRACT

The present invention relates to a peripheral apparatus which enables users to communicate with a mobile device via radio as well as optical transmission substantially simultaneously. The peripheral apparatus includes a radio card which includes circuitry for conducting RF communication; and an antenna apparatus that is selectively detachable from the radio card, the antenna apparatus includes an optical device for conducting optical communications. When the antenna apparatus is attached to the radio card, the radio card is capable of radio and optical communications. The peripheral apparatus is particularly useful in that an available com port does not have to be solely dedicated for optical communications. Furthermore, the peripheral apparatus avoids the problems associated with employing external wires to connect an optical transceiver to the mobile device. As a result, the present invention affords a user the benefit of simply attaching the peripheral apparatus to effect a mobile device that is capable of communicating via RF and optics substantially simultaneously.

34 Claims, 6 Drawing Sheets

DETACHABLE ANTENNA WITH OPTICAL PORT

TECHNICAL FIELD

The present invention relates generally to computer peripheral devices having a detachable portion, and more particularly to a peripheral device having a detachable portion with an optical port.

BACKGROUND OF THE INVENTION

In recent years the use of wireless mobile devices such as personal data assistants (PDA's), electronic planners, etc. have become wide spread. The wireless nature of these devices provides the user with the ability to move freely from one location to another without the hindrance of cords and other hardwired connections. Thus, users can enjoy the benefits of personalized computing power while traveling or simply commuting from one location to another. Although such wireless mobile devices are fairly self contained, there are many instances when they will need to interface with other devices such as a desk top computer or a Local Area Network (LAN). For instance, after returning from a business trip, a user may wish to download all information stored in their PDA to their office desk top computer. Additionally, connections between the mobile device and a LAN may often be necessary to print documents to a printer connected to the LAN.

In order to avoid the need to carry around special serial or parallel connectors which are capable of connecting mobile devices to desk top computers and LANs, many mobile devices come pre-equipped with a bi-directional optical communication port (e.g., a bi-directional infrared (IR) port which complies with published infrared data association (IRDA) standards). Using the optical port, the mobile devices can wirelessly upload and download information from any other device capable of optical communication. Thus, the user no longer needs to carry around extra cables each time an optical transaction needs to take place with the mobile device.

In order to accommodate the increasing usage of mobile devices, many computers now come pre-equipped with drivers which allow optical transceivers to be connected to the computer via one of the standard communication (COM) ports. Thus, wireless devices with optical ports can now communicate with these computers once the connecting optical device is attached to the computer.

Unfortunately, even with the ability to add optics, host devices (e.g., desk top computers, lap top computers, mobile terminals, etc.) must still dedicate one of the available com ports for optical communication thus limiting other equipment that could be attached. Furthermore, wires associated with optical transceivers connected to the host device or LAN often come in the way of a user.

Thus, what is needed is a convenient method and apparatus for transferring optical communication from a host device to another device which avoids the difficulties described above.

SUMMARY OF THE INVENTION

The present invention relates to a peripheral apparatus which enables users to communicate with a host device via radio as well as optical transmission substantially simultaneously. The peripheral apparatus is particularly useful in that an available com port does not have to be solely dedicated for optical communications. Furthermore, the peripheral apparatus avoids the problems associated with employing external wires to connect an optical transceiver to the host device. As a result, the present invention affords a user the benefit of simply attaching the peripheral apparatus to the host device so that is capable of communicating via RF and optics substantially simultaneously.

More particularly, the peripheral apparatus includes a PC card having a selectively detachable antenna. The detachable antenna includes at least one radio antenna and an optical port (i.e., optical device). When the detachable antenna is coupled to the PC card of the peripheral device, the peripheral apparatus is capable of communicating via RF and optical communications. Furthermore, the peripheral apparatus employs a unique polling scheme which affords a host device substantially simultaneous radio and optical communications with one or more other devices.

According to one embodiment of the present invention, a peripheral apparatus is provided, including: a PC card including circuitry for handling radio frequency (RF) communications and optical communications; and an antenna apparatus, selectively detachable from the PC card, including at least one antenna element operative in combination with the PC card for conducting the RF communications; and an optical device operative in combination with the PC card for conducting the optical communications.

According to another embodiment of the present invention, an antenna apparatus selectively detachable from a PC card is provided, the PC card including circuitry for handling RF communication and optical communication, the antenna apparatus including: at least one RF antenna operative in combination with the PC card for conducting RF communications; and an optical device operative in combination with the PC card for conducting optical communication.

In accordance with still another aspect of the invention, a mobile unit in combination with a peripheral apparatus is provided, the combination including: a mobile unit, including: a housing; electronic circuitry within the housing, the electronic circuitry being able to carry out operations of the mobile unit; and a peripheral apparatus, comprising: a PC card including circuitry for handling radio frequency (RF) communications and optical communications; an antenna apparatus, selectively detachable from the PC card, including at least one antenna element operative in combination with the PC card for conducting the RF communications; and an optical device operative in combination with the PC card for conducting the optical communications.

According to yet another aspect of the present invention, a method for providing RF communications and optical communications to a mobile unit is provided, comprising the steps of: attaching a peripheral apparatus to the mobile terminal, the peripheral apparatus including: a PC card including circuitry for handling radio frequency (RF) communications and optical communications; and a detachable antenna, the detachable antenna including an optical device for optical communications; using the circuitry including in the PC card to periodically poll the optical device to determine if optical communications are being transmitted to the mobile unit; and disabling the radio device and enabling the optical device upon determining that optical communications are being transmitted to the mobile unit.

To the accomplishment of the foregoing and related ends, the invention, then, comprises the features hereinafter fully described and particularly pointed out in the claims. The following description and the annexed drawings set forth in detail certain illustrative embodiments of the invention.

These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout. It should be noted that the terms "PCMCIA card" and "PC card" are employed interchangeably throughout the specification and claims.

Figure 1:
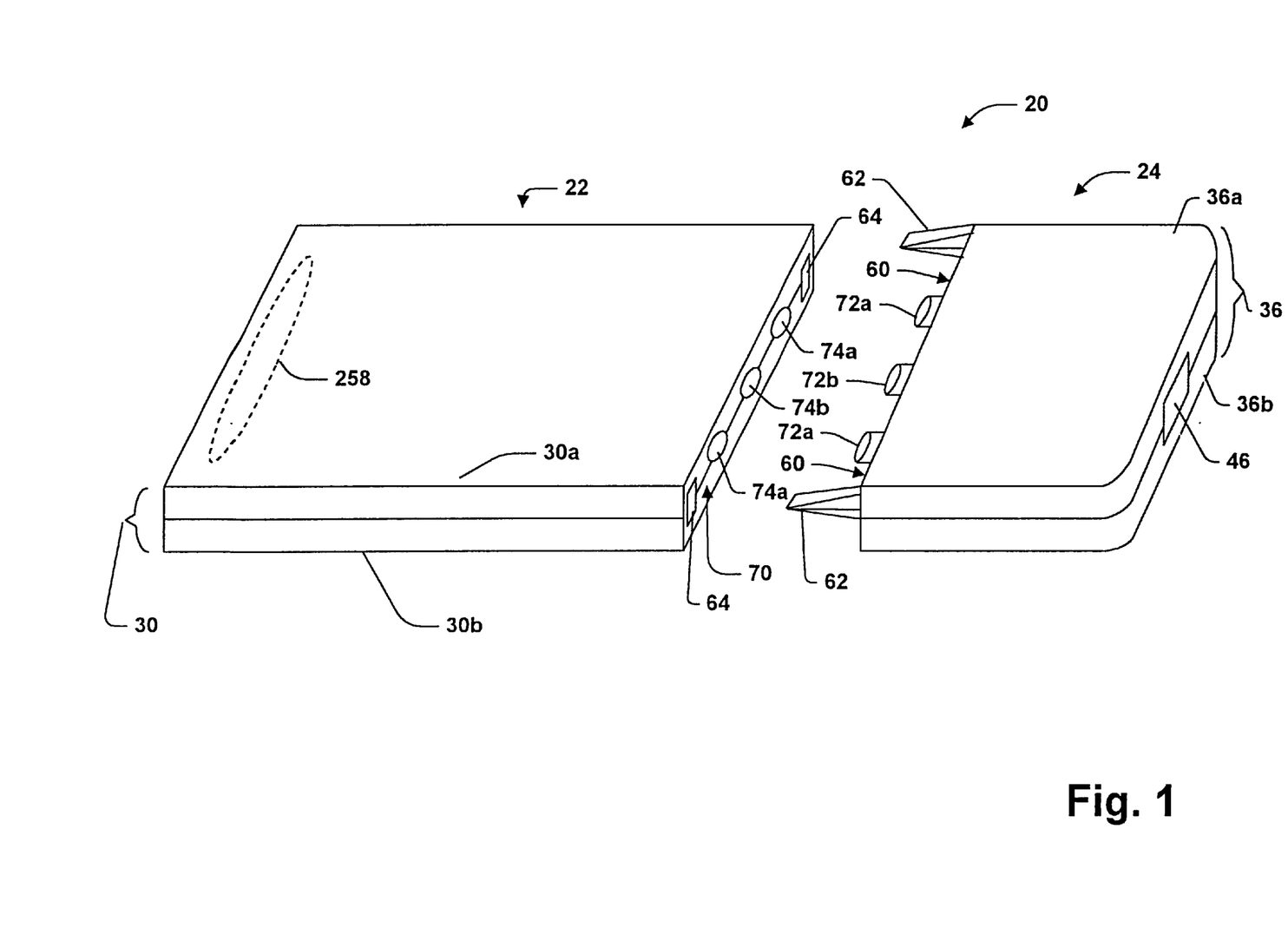
FIG. 1 is a perspective view of a PCMCIA card with a detachable antenna in accordance with the present invention.

Referring initially to FIG. 1, peripheral apparatus referred to hereinafter as either a wireless network adapter card or a radio card is shown generally at 20. The wireless network adapter card 20 includes a PCMCIA card 22 and a detachable antenna 24. The PCMCIA card 22 includes a card-shaped housing 30 having a top cover 30a and a bottom cover 30b. Included within the housing 30 is an integrated circuit (IC) board 32 (see FIG. 3). The housing 30 is made of plastic or metal but includes RF shielding material to minimize RF leakage into the surrounding area. The top and bottom covers 30a and 30b are ultrasonically welded together and or secured together by small screws, adhesives or other fastening means as is conventional.

Figure 5:
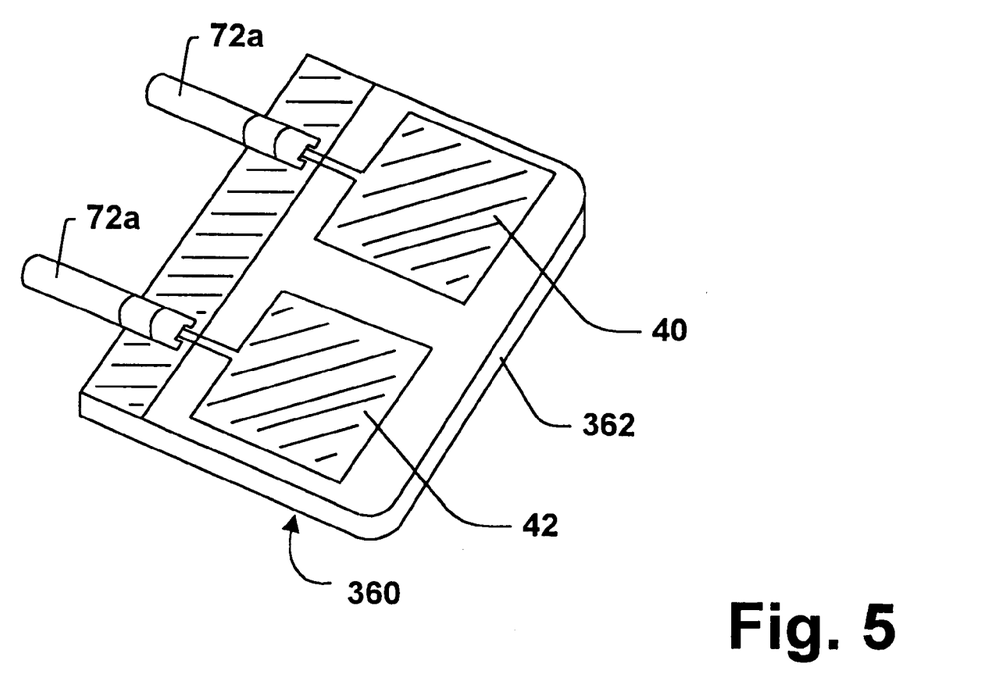
FIG. 5 is a perspective view of an antenna element included within the detachable antenna in accordance with the present invention.

The detachable antenna 24 includes a card-shaped housing 36 having a top cover 36a and a bottom cover 36b which form a radome for a pair of patch 30 type diversity antennas 40, 42 housed therein (see FIG. 5). The housing 36 is made of a plastic radome material such as Lexan which allows radio frequency (RF) energy to pass therethrough with little or no attenuation while still providing structural support and rigidity. The top and bottom covers 36a, 36b may be ultrasonically welded together or otherwise joined according to conventional techniques. The detachable antenna 24 also includes an optics window 46. As will be discussed in greater detail below, the optics window 46 provides for the transmission and reception of light waves carrying data (e.g., infrared). The optics window 46 is preferably made of suitable transparent material for infrared radiations at wavelengths of interest. Any suitable type of window 46 may be used to carry out the present invention.

Figure 3:
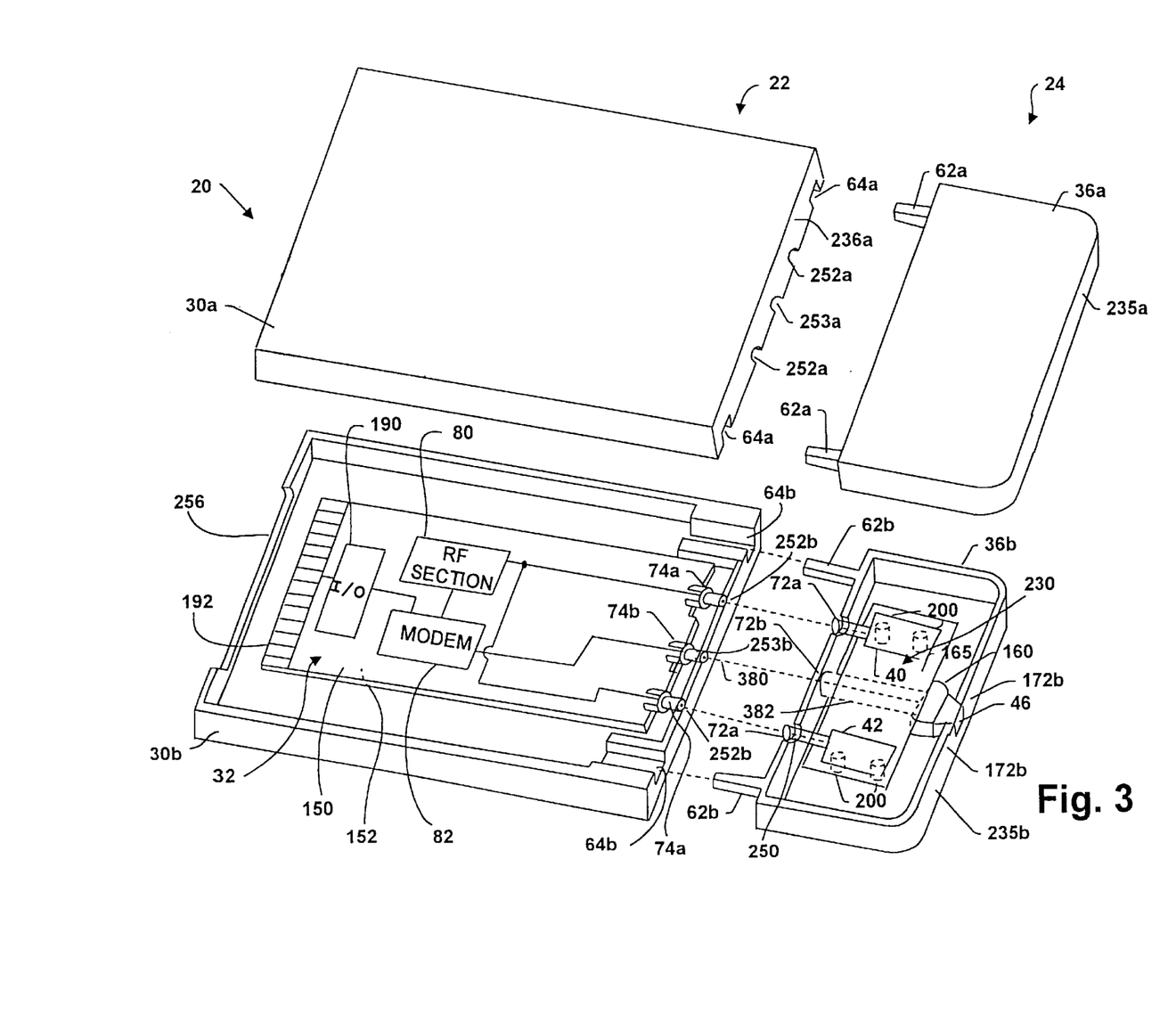
FIG. 3 is an exploded view of the PCMCIA card and detachable antenna (with the antenna element detached) in accordance with the present invention.

The detachable antenna 24 is selectively detachable from the PCMCIA card 22 by way of a number of frictional connections. More particularly, an edge 60 of the detachable antenna 24 includes a pair of wedge shape tines 62. The tines 62 are designed to mate in forced frictional engagement with a corresponding pair of wedge shape channels 64 located on an edge 70 of the PCMCIA card 22. Furthermore, the detachable antenna 24 includes a triad of male plug-type connectors 72 which protrude from the edge 60 of the antenna housing 36. The connectors 72a provide respective RF connections between the antenna element within the detachable antenna 24 as discussed more fully below and the integrated circuit board 32 within the PCMCIA card 22. The connector 72b provides an optical connection between the optical section within the detachable antenna 24 as discussed more fully below and the integrated circuit board 32 within the PCMCIA card 22. The connectors 72 are designed to mate with corresponding female-type connectors 74 located flush with the edge 70 of the PCMCIA card 22. The connectors 74a in turn are connected to a radio (i.e., RF section) 80 within the PCMCIA card 22. The radio 80 is tied to a modem 82 (FIG. 3). The connector 74b is connected directly to the modem 82.

The connectors 72 and 74 are preferably of a type which provides both electrical and mechanical connection between the detachable antenna 24 and the PCMCIA card 22 for a secure fit in combination with the tines 62. The connectors 72 and 74 preferably include a snap type mechanism or the like which provides for a releasable locking action between the antenna 24 and the PCMCIA card 22 when the tines 62 are fully engaged within the channels 64 and the edges 60 and 70 are substantially flush. By firmly pulling the antenna 24 and the PCMCIA card 22 apart, the snap type mechanism releases allowing the antenna 24 to be separated from the PCMCIA card 22.

Thus, the detachable antenna 24 affords for quick and easy installation to the PC card 22 to afford a user with the ability to communicate via radio and optical communications. As will be discussed below, since RF antennas as wells as optics are enclosed in the detachable antenna 24, the user is freed from having to dedicate an available com port of a host device (not shown) to communicate optically. Furthermore, the user is freed from the nuisance associated with loose wires typical to modular optics sections that are coupled a the host device such as a desk top computer. The present invention affords for a user to simply snap the detachable antenna 24 to the PC card 22 so that the host device can communicate via either RF and optical communications. Furthermore, as will be discussed in greater detail below, the present invention employs a unique polling protocol which provides for the host device to communicate via RF and optics substantially simultaneously.

Figure 2A:
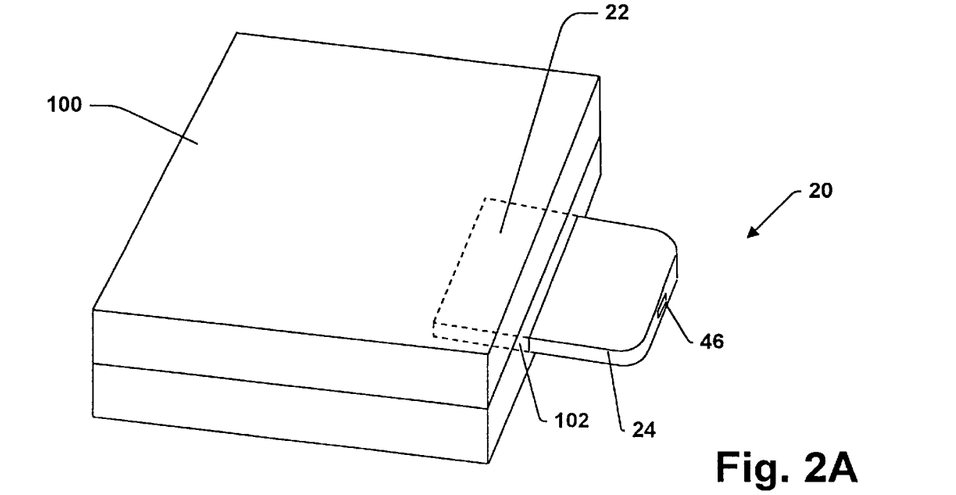
FIG. 2A is a perspective view of the PCMCIA card with the detachable antenna inserted in a notebook computer PCMCIA card slot in accordance with the present invention.
Figure 2B:
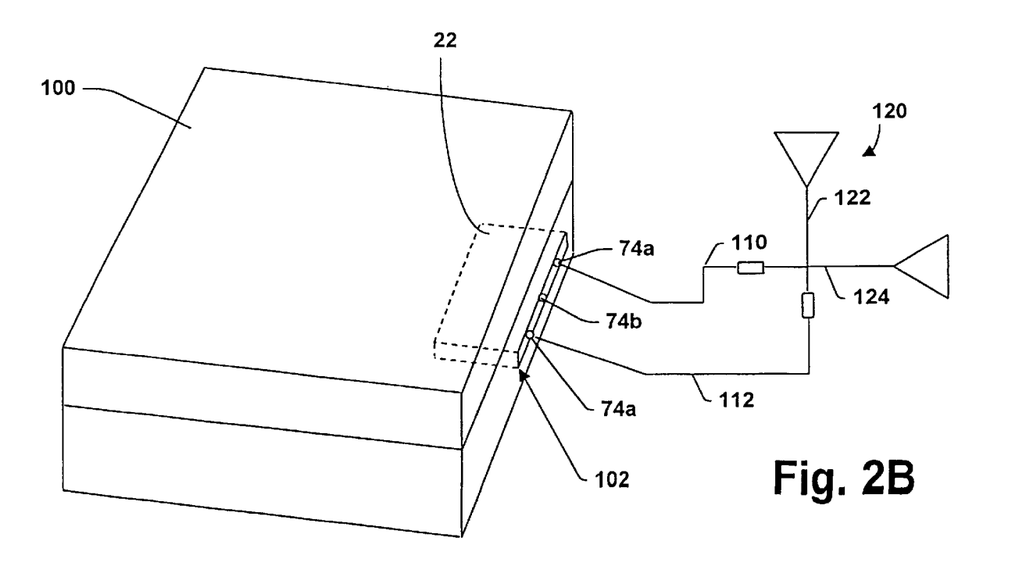
FIG. 2B is a perspective view of the PCMCIA card of FIG. 2A with the antenna detached and an external antenna connected thereto in accordance with the present invention.

Referring briefly now to FIGS. 2A and 2B, the network adapter card 20 is shown, for example, as used in a notebook type personal computer 100. FIG. 2A illustrates the use of the card 20 with the antenna 24 attached to the PCMCIA card 22. The PCMCIA card 22 is inserted into a PCMCIA card slot 102 as is conventional. The antenna 24 extends outwardly from the computer 100 in order to transmit and receive radio and/or optical communications based on operations controlled by the computer 100.

In the event a user wishes to connect the PCMCIA card 22 to an auxiliary antenna, the antenna 24 is detached from the PCMCIA card 22 in the manner noted above. Thus, the connectors 74 on the edge 70 are exposed when the PCMCIA card 22 is inserted in the slot 102 as shown in FIG. 2B. Corresponding connectors on the ends of cables 110, 112 are utilized to connect auxiliary antennas 120 to the radio within the PCMCIA card 22. The antennas 120 are made up of two separate elements 122 and 124 which are oriented orthogonally as is known.

Referring now to FIG. 3, an exploded view of the network adapter card 20 is shown. As can be seen, the PCMCIA card 22 has housed therein an IC board 32 which includes a top side 150 and a bottom side 152. The top 150 and bottom 152 sides of the IC board 32 contain electronic circuitry which enables the PCMCIA card 22 to communicate wirelessly via the detachable antenna 24. Generally speaking, the IC board 32 includes the modem 82 which controls both an RF section 80 and an optics section 160. The modem 82 preferably is an MSM 7730 Wireless LAN Modem Chip made by Oki Semiconductor of Japan. However, it is to be understood that any suitable modem or device may be employed to carry out the present invention. The modem 82 will periodically poll the optics section 160 to determine if any optical information is being transmitted to the host device. The optics section 160 includes an optical transceiver 180 (FIG. 4) and an optical window 46. The optical transceiver 180 includes an optical transmitter 182 (FIG. 4) for transmitting data optically (e.g., via an LED). The optical transceiver 180 also includes an optical receiver 184 for receiving data optically (e.g., via a photo diode). In this exemplary embodiment, the optical transceiver 180 performs its optical communications via infrared light. However, it will be appreciated that other suitable optical mediums (i.e., light of other frequencies) may be employed and fall within the scope of this invention. The optical window 46 provides for optical communications by permitting light waves containing data to be input and output to the detachable antenna 24 via the optical window 46.

As will be discussed in greater detail below, the modem 82 may periodically poll the optical section. If optical transmission is detected, the modem 82 temporarily stops processing RF communication and instead handles the optical communication. The modem 82 is also connected to an input/output (I/0) port 190 which is coupled to a multi-terminal connector 192. The connector 192 enables the card 20 to be connected to a corresponding connector in the PCMCIA card slot 102 of the host device (FIGS. 2A–2B) as is conventional. Each of the connectors 74*a* is connected to the RF section 80 in order that radio signals to and from the RF section are transmitted/received by whichever type antenna is connected to the connectors 72*a*.

In FIG. 3, molded into the bottom cover 36*b* is a set of standoffs 200 on top of which the antenna elements 40, 42 rest, respectively. Further detail as to the antennas 40, 42 is discussed below with respect to FIG. 5. Returning back to the top and bottom covers 36*a* and 36*b*, each tine 62 is made up of a half wedge shape tine 62*a* and 62*b* extending from the top and bottom covers 36*a* and 36*b*, respectively. The corresponding wedge shape channels 64 are made up of half wedge shape channels 64*a* and 64*b* in the walls 236*a* and 236*b* of the top and bottom covers 30*a* and 30*b*, respectively. The top cover 36*a* of the detachable antenna housing 36 includes two semicircular recesses (not shown) and one semisquare recess (not shown) which combined with the semicircular recesses 250*a* and the semisquare recess 250*b*, respectively, in the bottom cover 36*b* form apertures through which the connectors 72 (FIG. 1) extend. Similarly, the top cover 30*a* of the PCMCIA card 22 includes semicircular recesses 252*a* which combined with the semicircular recesses 252*b* in the bottom cover 30*b* form apertures through which the connectors 74*a* are exposed. Likewise, the top cover 30*a* of the PCMCIA card 22 also includes semisquare recess 253*a* which combined with the semisquare recess 253*b* in the bottom cover 30*b* form apertures through which the connector 74*b* are exposed. The connector 74*b* ties into the connector 72*b* which is coupled to the optics section 160. The top cover 30*a* also includes a slot forming recess (not shown) which combined with the slot forming recess 256 in the bottom cover 30*b* forms a slot 258 (shown in phantom in FIG. 1) which allows the card 20 to be connected to a computer via a PCMCIA card slot.

Figure 4:
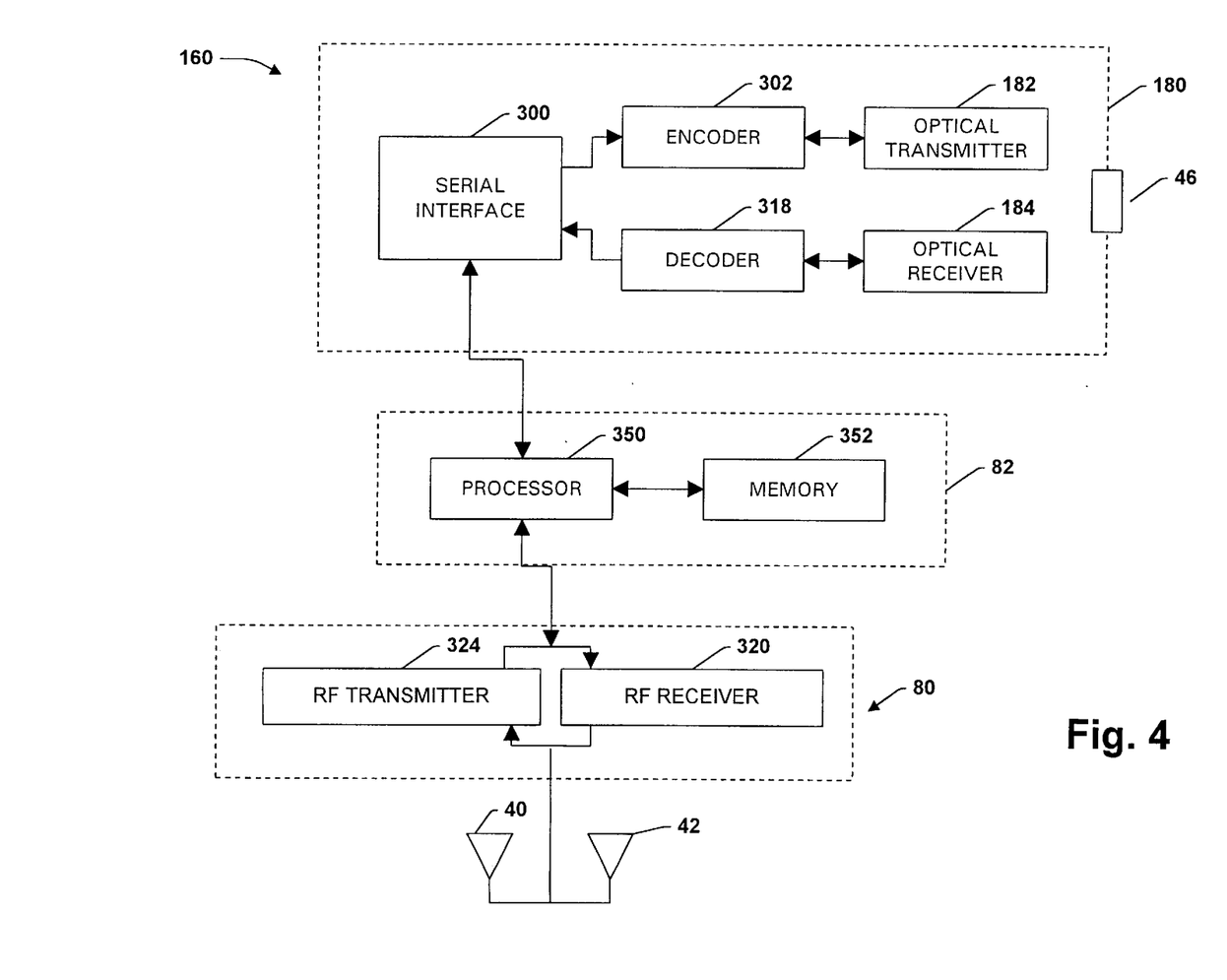
FIG. 4 is a block diagram representing the basic structure of an optics section, modem and RF section in accordance with the present invention.

Turning now to FIG. 4, a block diagram of the general basic structure of the optics section 160, modem 220 and the RF section 80 is shown. The optical transceiver 180 includes a programmable serial interface device (SID) 300 such as a 16550 or 16450 UART (universal asynchronous receiver and transmitter) from National Semiconductor. Technically equivalent interface devices include but are not limited to universal synchronous and asynchronous receivers and transmitters (USARTs), asynchronous communications interface adapters (ACIAs), serial input/output (SIO) devices, data link controllers, multiple protocol communications controllers and serial communications controllers.

The serial interface device 300 receives data from the host device (typically in parallel format) through a serial output location and transmits an equivalent serial bit stream to an encoder 302. The encoder 302 transforms the bits into electrical pulses that occupy less than the full bit time and passes them to the optical transmitter 182 such as an infrared transmitter. The optical transmitter 182 transforms the electrical pulses into infrared light pulses for example and broadcasts the light pulses at a selected baud rate. The receiving side of the optical transceiver 180 includes the optical receiver 184 such as an IR receiver that receives similar light pulses from a transmitter from an another device and transforms them into electrical pulses. The optical receiver 184 passes these electrical pulses to a decoder 318 for decoding the electrical pulses into a serial bit stream. The decoder 318 in turn routes the bit stream to a serial input location on the serial interface device 300 for communication to the modem 82. The optical transceiver 180 preferably operates in half-duplex mode (ile., with only the optical transmitter 182 or optical receiver 184 active at any given time) in order to prevent the optical transceiver 180 from receiving the data it transmits. However, it will be appreciated that with additional shielding, the optical transceiver 180 could be operated in full-duplex mode (i.e., both the optical transmitter 182 and the optical receiver 184 simultaneously active).

It will be appreciated that the serial interface 300 may include or be coupled to a programmable baud rate generator (not shown) for transmitting the serial bit stream at selectable baud rates. The serial interface 300 also may include an SID clock (not shown) that runs at a multiple of the baud rate so as to clock the encoder 302 and decoder 318. Accordingly, an operator of the host device could selectably control the optical transmission rate.

The modem is also tied to the RF section 80 which provides for radio communications with another device. The RF section 80 includes a radio receiver 320 and a radio transmitter 324 for receiving and transmitting radio signals in connection with the operation of the host device and the detachable antenna 24. The RF section 80 is tied to the patch antennas 40 and 42 located within the detachable antenna 24. The RF section 80 and the optics section 180 are coupled to a processor 350 tied to the modem 82. The processor 350 is responsible for controlling the overall operation of the modem 82, the RF section 80 and the optics section 180. For example, the processor 350 controls the operation of the modem 82 with respect to discriminating between incoming radio and optical signals. The processor 350 is also responsible for enabling and disabling the RF section 80 and the optics section 180, respectively. In addition, the processor 350 controls the operation of the RF section 80 and the optics section 180 with respect to the information received and transmitted by each section, respectively. Generally speaking, the processor 350 is programmed to control and to operate the various components relating to the modem 82, the RF section 80 and the optics section 180 in order to carry out the various functions described herein.

A memory 352, tied to the processor 350, stores program code executed by the processor 350 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 352 also serves as a storage medium for storing information input by the user and/or received from or transmitted by either of the RF section 80 and the optics section 180. The memory 353 may include both volatile and non-volatile memory.

FIG. 5 illustrates an exemplary antenna element 360 which fits within the housing 36 of the detachable antenna 24. The antenna element 360 in this embodiment includes separate patch antenna elements 40 and 42 formed on a substrate 362. The substrate 362 is sized to fit within the housing 36 and rest upon the standoffs 200 as illustrated in FIG. 3 discussed above. Each patch antenna element 40, 42 is connected to a corresponding one of the connectors 72*a*. As shown, the connectors 72*a* are each mounted securely to the substrate 362. In an alternative embodiment, the antenna element 360 could include monopole, dipole, or other antennas, as will be appreciated.

Turning now to the optical polling protocol of the present invention, it works as follows. The modem 82 will periodically poll the optical transceiver 180 in the detachable antenna 24 to see if any optical information is being transmitted to the host device. For example, the modem 82 may attempt to poll the optical transceiver 180 every 300–400 msec. If optical transmission is detected, the modem 82 temporarily stops processing RF communication and instead handles the optical communication.

In particular, the modem 82 is typically switched to receive and transmit data over the RF spectrum via the RF section 80. However, upon detection of optical transmission thereto, the modem 82 switches to the optical section 160 so that data can be received over the optical spectrum (e.g., IR spectrum) via the optical receiver 184. Similarly, when a user of the host device decides to transmit data optically, the modem 82 likewise disables the RF transmitter 324 and enables the optical transmitter 182 so that data can be transmitted over the optical spectrum (e.g., IR spectrum) via the optical transmitter 182.

Once the receiving and/or transmitting of optical data is completed, the modem 82 will disable the optical transceiver 180 and enable the RF section 80, which is its default state.

As for the optical polling, it works as follows. As discussed above, the modem 82 defaults to communicating via the RF section 80. However, the modem 82 will periodically poll the optical transceiver 180 to determine if any optical information is being transmitted to the host device. In the preferred embodiment, the modem 82 will poll the optical transceiver 180 at least once per second. However, if the modem 82 is currently handling RF communication, then the modem 82 will suspend its polling until the RF communication has been completed. In other words, the ongoing RF communication takes precedence over the optical polling. Similarly, if the modem 82 is currently handling optical communication, the modem 82 will complete the optical communication before returning to the RF mode. Only if no RF communication has occurred within the last 20 msec will the modem 82 continue its next poll in the poll cycle. If RF communication is currently occurring, the modem 82 will wait until all communication has subsided for 20 msec, and then immediatedly poll the optical transceiver 180 again. If during a poll of the optical transceiver 180 the modem 82 detects optical communication, the modem 82 will immediately handle the optical communication until completed.

The modem 82 can determine if optical communications are be transmitted to the host device in a variety of ways. For example, the modem 82 may determine if an optical transmission is occurring by simply sensing a signal on line 380 (FIG. 3) from the optical section 160. Line 380 is housed in a conduit 382 (shown in phantom) which may be made of any material suitable for isolating the signal line 380 from noise. Line 380 includes several sub-lines (e.g., a control line, a voltage line, a ground line, a transmit line, a receive line, etc.) for facilitating the optical communications. According to another method, the modem 82 could include an optical detector (not shown) such as for example an IR detector which detects an IR signal over an RF signal by resonating the incoming signal at a detection frequency. It will be appreciated that a variety of signal discrimination and/or detection means may be employed, all of whcich fall within the scope of the present invention.

The modem 82 can handle only one type of communication at any given time. Accordingly, when the modem 82 is serving the optical section 160, any RF communication directed to the radio 80 in the PCMCIA card will not be received. Thus, the transmitting device will not receive an acknowledgment and would simply later transmit the same RF message. As optical dumps are very quick, there typically will not be any significant down time for the RF section 80. Thus, the radio card 20 will work substantially the same as it does without the optical section 46 with the exception of the few moments when optical communication is occurring.

Thus, the present invention provides for communicating via both radio and optical communications substantially simultaneously. For example, the present invention could be employed in a retail store environment where shelf tags are being used. Shelf tag systems are known in which the so-called "shelf tags" contain means for programming information into small display devices which are attached to front edges of merchandise storage shelves. The devices or tags would then retain the programmed data which may be acquired by the reader in the radio card 20, for example. Information may be communicated between the shelf tag and the host device by various means including radio frequency and/or optical transmission. Information may be communicated via optical readers in the data and communication terminal as read from liquid crystals, or by other communication such as infrared optical, or low power RF data messages. A problem with shelf tag systems which update the shelf tags via RF communications is that neighboring shelf tags (which are not intended to be updated) may inadvertently be updated with incorrect information due to receiving RF signals not intended for them.

The present invention can be employed to avoid such problems in that the moblie terminal (i.e., host device) being used to update the shelf tags could be updated from a host computer (not shown) via radio communications and the mobile terminal could update the proper shelf tags optically. Since optical transmissions are more focused and guided, inadvertent updating of neighboring shelf tags could be avoided. It should be appreciated that there are numerous such applications of the present invention.

Figure 6:
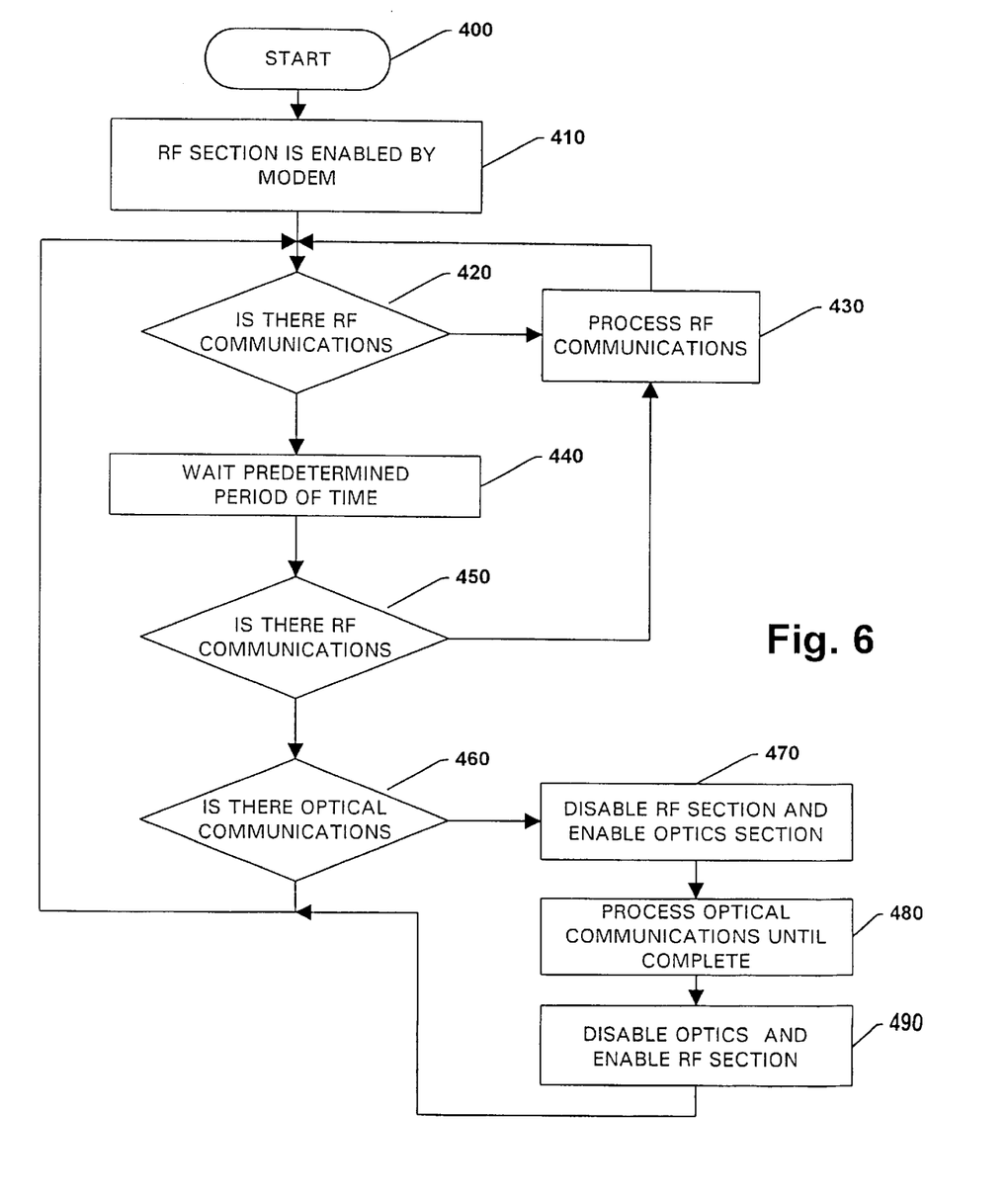
FIG. 6 is a flow chart representing the operation of the PCMCIA card and the detachable antenna in accordance with the present invention.

Turning now to FIG. 6, a flowchart representing the operation of the PC card 20 and the datachable antenna 24 in accordance with the present invention is presented. In step 400, power is first applied to the PC card 20 by way of it being inserted (i.e., connected) to the host device as is conventional. Thus, the modem 82 is activated. Next in step 410, the RF section 80 is enabled by the modem 82. The RF section 80 being enabled is generally the default arrangement for the modem 82 since the host device primarily receives radio signals as opposed to optical signals. In step 420, the processor 350 determines if there is any RF communications being transmitted to the mobile device or being transmitted by the mobile device. If yes, the processor 350 proceeds to step 430 where it processes the RF communications. After the RF communications are processed in step 430, the process returns to step 420. If in step 420 there is no RF communications being transmitted to the host device or being transmitted by the host device, the processor 350 advances to step 440. In step 440, the processor 350 waits a predetermined period of time and then determines again in step 450 if there is RF communications being transmitted to the mobile device or being transmitted by the mobile device. If yes, the processor 350 returns to step 430 where it processes the RF information as described above.

If no, the processor 350 determines in step 460 if there is optical communications being transmitted to the host device or being transmitted by the host device. If yes, the processor 350 moves to step 470 where it disables the RF section 80 and enables the optics section 180. Then, the processor 350 proceeds to step 480 where the processor 350 processes the optical communication until complete. Once the processing of the optical communication is complete, the processor 350 in step 490 disables the optics section 180 and reenables the RF section 80. After the RF section 80 is re-enabled in step 490, the process returns to step 420. If in step 460, the processor 350 determines that there is no optical communications being transmitted to the mobile device or being transmitted by the mobile device, the process returns to step 420.

Thus, the present invention affords for a peripheral apparatus which provides for a host device to communicate via radio and optical communications. The unique polling protocol makes possible substantially simultaneous communications using radio and optical mediums. Furthermore, the radio card 20 provides for a host device to communicate optically without having to designate a free com port. The present invention makes possible a device which can employ a com port already in use for radio communications to be shared so that optical communications can be effected as well. Moreover, the integrated design of the peripheral antenna avoids the need for having to connect cumbersome wires in order to couple an optical device to the host device.

In addition, it will be appreciated that as an alternative to polling the optical section 160, the present invention could employ an interrupt driven protocol whereby the optical device 160 could provide an interrupt when an optical signal is being transmitted to the host device. In response to the interrupt, the present invention could disable the RF section 80 and enable the optical section 160 in the manner described above. Similarly, the optical device 160 could provide another interrupt when the optical transmission from the other device is complete. Accordingly, the present invention in response to the second interrupt, could enable the RF section 80 and disable the optical section 160 in the manner described above. Alternatively, the PC card 20 could sense when the optical transmissions from the other device is complete in any of a number of manners and enable the RF section 80 and disable the optical section 160 in the manner described above.

Although the present invention has been described in accordance with its preferred aspects, it will be appreciated that the radio card 20 may include any combination of diverse functions elements. For instance, extended data memory capacity or a telephone modem could be included as part of the radio card of the peripheral apparatus.

Furthermore, it will be appreciated that a buffer (not shown) could be employed in accordance with the present invention. The buffer could be either external or internal to the modem 82. The buffer could store RF data that is being transmitted to the mobile terminal during an optical transmission session. More specifically, if the modem 82 is currently handling optical communication and during this period RF communication is being transmitted to the mobile device, the RF data could be stored in the buffer. After the modem 82 has completed its optical data transaction, it could retrieve the RF data stored in the buffer. In this manner, the device transmitting the RF data would not have to retransmit the RF data, and the chance for losing data would be reduced.

Although the invention has been shown and described with respect to certain preferred embodiments, it is obvious that equivalents and modifications will occur to others skilled in the art upon the reading and understanding of the specification. For example, the invention has been described above primarily in the context of a PCMCIA type peripheral device with a detachable antenna. However, it will be appreciated that the present invention can be used with other types of peripheral devices having a detachable portion. The buffer similarly could be used to handle optical communications.

The present invention includes all such equivalents and modifications, and is limited only by the scope of the following claims.

What is claimed is:

1. A peripheral apparatus, comprising:
   a PC card including circuitry for handling radio frequency (RF) communications and optical communications;
   an antenna apparatus, selectively detachable from the PC card, including at least one antenna element operative in combination with the PC card for conducting the RF communications;
   an optical device operative in combination with the PC card for conducting the optical communications; and
   a processor for processing both RF and optical communications, wherein the processor periodically polls the optical device to determine if optical communications are being transmitted to the peripheral apparatus.

2. The peripheral apparatus of claim 1, wherein the optical communications is infrared communications.

3. The peripheral apparatus of claim 1, wherein the PC card circuitry includes a radio frequency receiver.

4. The peripheral apparatus of claim 1, wherein the PC card circuitry includes a radio frequency transmitter.

5. The peripheral apparatus of claim 1, wherein the PC card circuitry includes a radio frequency transceiver.

6. The peripheral apparatus of claim 1, wherein the optical device includes an optical receiver.

7. The peripheral apparatus of claim 1, wherein the optical device includes an optical transmitter.

8. The peripheral apparatus of claim 1, wherein the optical device includes an optical transceiver.

9. The peripheral apparatus of claim 1, wherein the PC card is capable of RF and optical communications substantially simultaneously.

10. The peripheral apparatus of claim 1, wherein the peripheral apparatus is used with a laptop computer.

11. The peripheral apparatus of claim 1, wherein the peripheral apparatus is used with a mobile terminal.

12. The peripheral apparatus of claim 1, wherein the antenna apparatus is adapted to interface with the PC card.

13. The peripheral apparatus of claim 1, wherein the antenna apparatus has substantially the same cross-sectional area as that of the PC card.

14. The peripheral apparatus of claim 1, wherein said PC card circuitry includes means for communicating data associated with radio frequency (RF) communications and data associated with optical communications, via a common input/output port.

15. The peripheral apparatus of claim 1, wherein the antenna apparatus further includes at least one RF antenna.

16. The peripheral apparatus of claim 1, wherein the processor disables RF circuitry of the PC card and enables the optical device upon determining that optical communications are being transmitted to the peripheral apparatus.

17. The peripheral apparatus of claim 1, wherein the processor disables RF circuitry of the PC card and enables the optical device when optical communications are to be transmitted by the peripheral apparatus.

18. A peripheral apparatus, comprising:
   a PC card including circuitry for handling radio frequency (RF) communications and optical communications;
   an antenna apparatus, selectively detachable from the PC card, including at least one antenna element operative in combination with the PC card for conducting the RF communications;
   an optical device operative in combination with the PC card for conducting the optical communications; and
   a processor for processing both radio and optical communications, wherein the processor disables RF circuitry of the PC card and enables the optical device upon determining that optical communications are being transmitted to the peripheral apparatus.

19. An antenna apparatus selectively detachable from a PC card, the PC card including circuitry for handling RF communication and optical communication, the antenna apparatus comprising:
   at least one RF antenna operative in combination with the PC card for conducting RF communications;
   an optical device operative in combination with the PC card for conducting optical communications, wherein said PC card includes processing means for selectively enabling and disabling RF and optical communications such that data associated with the RF and optical communications can share a common communications path.

20. The antenna apparatus of claim 19, wherein the at least one RF antenna and the optical device interface with a modem of the PC card when the antenna apparatus is attached to the PC card.

21. The antenna apparatus of claim 19, wherein the at least one RF antenna is coupled to RF circuitry of the PC card.

22. The antenna apparatus of claim 19, wherein the optical device includes an optical transceiver.

23. A mobile unit in combination with a peripheral apparatus, comprising:
   a mobile unit, including:
      a housing;
      electronic circuitry within the housing, the electronic circuitry being able to carry out operations of the mobile unit; and
   a peripheral apparatus, comprising:
      a PC card including circuitry for handling radio frequency (RF) communications and optical communications;
      an antenna apparatus, selectively detachable from the PC card, including at least one antenna element operative in combination with the PC card for conducting the RF communications;
      an optical device operative in combination with the PC card for conducting the optical communications; and
      a processor for processing RF communications and optical communications, wherein the processor periodically polls the optical device to determine if optical communications are being transmitted to the mobile unit.

24. The combination of claim 23, wherein the peripheral apparatus can communicate via RF communications and optical communications substantially simultaneously.

25. The combination of claim 23, wherein the detachable antenna is adapted to interface with the PC card.

26. The combination of claim 23, wherein said PC card circuitry includes means for communicating data associated with radio frequency (RF) communications and data associated with optical communications, via a common input/output port.

27. The combination of claim 23, wherein the optical communications are infrared communications.

28. The combination of claim 23, wherein the processor disables RF circuitry of the PC card and enables the optical device upon determination of optical communications being transmitted to the mobile unit.

29. The combination of claim 23, wherein the processor disables RF circuitry of the PC card and enables the optical device when optical communications are to be transmitted by the mobile unit.

30. A peripheral apparatus, comprising:
   a PC card including circuitry for handling radio frequency (RF) communications and optical communications;
   an antenna apparatus, selectively detachable from the PC card, including at least one antenna element operative in combination with the PC card for conducting the RF communications;
   an optical device operative in combination with the PC card for conducting the optical communications; and
   a processor for processing both radio and optical communications, wherein the processor disables RF circuitry of the PC card and enables the optical device when optical communications are to be transmitted by the peripheral apparatus.

31. A method for providing RF communications and optical communications to a mobile unit, comprising the steps of:
   attaching a peripheral apparatus to the mobile terminal, the peripheral apparatus including:
      a PC card including circuitry for handling radio frequency (RF) communications and optical communications; and a detachable antenna, the detachable antenna including an optical device for optical communications;

using the circuitry included in the PC card to periodically poll the optical device to determine if optical communications are being transmitted to the mobile unit; and disabling circuitry for handling RF communications and enabling the optical device, upon determining that optical communications are being transmitted to the mobile unit.

32. The method of claim 31, further including the step of:

disabling circuitry for handling RF communications and enabling the optical device upon determining that optical communications are to be transmitted by the mobile unit.

33. A mobile unit in combination with a peripheral apparatus, comprising:

a mobile unit, including:
  a housing;
  electronic circuitry within the housing, the electronic circuitry being able to carry out operations of the mobile unit; and a peripheral apparatus, comprising:
  a PC card including circuitry for handling radio frequency (RF) communications and optical communications;
  an antenna apparatus, selectively detachable from the PC card, including at least one antenna element operative in combination with the PC card for conducting the RF communications;
  an optical device operative in combination with the PC card for conducting the optical communications; and
  a processor for processing RF communications and optical communications, wherein the processor disables RF circuitry of the PC card and enables the optical device when optical communications are to be transmitted by the mobile unit.

34. A mobile unit in combination with a peripheral apparatus, comprising:

a mobile unit, including:
  a housing;
  electronic circuitry within the housing, the electronic circuitry being able to carry out operations of the mobile unit; and a peripheral apparatus, comprising:
  a PC card including circuitry for handling radio frequency (RF) communications and optical communications;
  an antenna apparatus, selectively detachable from the PC card, including at least one antenna element operative in combination with the PC card for conducting the RF communications;
  an optical device operative in combination with the PC card for conducting the optical communications; and
  a processor for processing RF communications and optical communications, wherein the processor disables RF circuitry of the PC card and enables the optical device upon determination of optical communications being transmitted to the mobile unit.

* * * * *